United States Patent
Mritunjai

(10) Patent No.: US 11,652,755 B1
(45) Date of Patent: May 16, 2023

(54) ADAPTIVE TELEMETRY USING COOPERATIVE SELECTIVE SUMMARIZATION METRIC REPORTING

(71) Applicant: Amazon Technologies, Inc., Seattle, WA (US)

(72) Inventor: Akhilesh Mritunjai, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 17/389,881

(22) Filed: Jul. 30, 2021

(51) Int. Cl.
| | |
|---|---|
| H04L 47/62 | (2022.01) |
| H04L 1/00 | (2006.01) |
| H04L 43/06 | (2022.01) |
| H04L 69/22 | (2022.01) |
| H04L 43/04 | (2022.01) |
| H04L 49/9057 | (2022.01) |

(52) U.S. Cl.
CPC ........ *H04L 47/6245* (2013.01); *H04L 1/0041* (2013.01); *H04L 43/04* (2013.01); *H04L 43/06* (2013.01); *H04L 49/9057* (2013.01); *H04L 69/22* (2013.01)

(58) Field of Classification Search
CPC ..... H04L 47/6245; H04L 43/04; H04L 43/06; H04L 1/0041; H04L 49/9057; H04L 69/22

USPC ........................................................ 370/412
See application file for complete search history.

(56) References Cited

U.S. PATENT DOCUMENTS

| | | | |
|---|---|---|---|
| 7,562,134 B1* | 7/2009 | Fingerhut | H04L 43/06 709/224 |
| 11,171,846 B1* | 11/2021 | Yalagandula | H04L 43/04 |
| 2014/0032491 A1* | 1/2014 | Neerincx | G06F 16/23 709/227 |
| 2015/0244617 A1* | 8/2015 | Nakil | H04L 41/0897 709/224 |
| 2019/0196898 A1* | 6/2019 | Sekiguchi | G06F 11/0709 |
| 2021/0045179 A1* | 2/2021 | Shoji | H04W 48/02 |

* cited by examiner

*Primary Examiner* — James E Springer
(74) *Attorney, Agent, or Firm* — Nicholson De Vos Webster & Elliott, LLP

(57) ABSTRACT

Techniques for adaptive telemetry using cooperative selective summarization metric reporting are described. Upon an impairment event preventing a client from transmitting raw log data to a server, the client switches to generating summarization data based on the raw log data and sends this summarization data to the server. The server may instruct the client which dimensions of data are to be generated and which time apertures apply for the generation of summary statistics. The client may also switch from a first-in first-out (FIFO) transmission mode to a last-in first-out (LIFO) transmission mode for eventually resending the raw log data, providing the server the most current information as timely as possible while leaving older data for later transmission.

20 Claims, 9 Drawing Sheets

OPERATIONS
600

```
┌─────────────────────────────────────────────────────────────┐
│ DETERMINING, BY A CLIENT PROCESS, THAT A SERVER IS UNABLE   │
│   TO RECEIVE A TRANSMISSION OF LOG DATA FROM THE CLIENT     │
│                       PROCESS 602                           │
└─────────────────────────────────────────────────────────────┘
                              │
                              ▼
┌─────────────────────────────────────────────────────────────┐
│  GENERATING, BY THE CLIENT PROCESS, A SUMMARIZATION DATA    │
│   THAT IS SMALLER IN SIZE THAN THE LOG DATA AND PROVIDES A  │
│  STATISTICAL SUMMARY OF AT LEAST SOME OF THE LOG DATA 604   │
└─────────────────────────────────────────────────────────────┘
                              │
                              ▼
┌─────────────────────────────────────────────────────────────┐
│     TRANSMITTING THE SUMMARIZATION DATA TO THE SERVER 606   │
└─────────────────────────────────────────────────────────────┘
```

*FIG. 6*

ADAPTIVE TELEMETRY USING COOPERATIVE SELECTIVE SUMMARIZATION METRIC REPORTING

BACKGROUND

Cloud computing platforms often provide on-demand, managed computing resources to customers. Such computing resources (e.g., compute and storage capacity) are often provisioned from large pools of capacity installed in data centers. Customers can request computing resources from the "cloud," and the cloud can provision compute resources to those customers. Technologies such as virtual machines and containers are often used to allow customers to securely share capacity of computer systems.

BRIEF DESCRIPTION OF DRAWINGS

Various embodiments in accordance with the present disclosure will be described with reference to the drawings, in which:

FIG. 6 is a flow diagram illustrating operations of a method for adaptive telemetry using cooperative selective summarization metric reporting according to some embodiments.

DETAILED DESCRIPTION

The present disclosure relates to methods, apparatus, systems, and non-transitory computer-readable storage media for adaptive telemetry using cooperative selective summarization metric reporting. According to some embodiments, upon a system (such as a monitoring service of a multi-tenant provider network) being overloaded or otherwise being unable to receive or timely process log data transmitted by clients, the clients can switch to generating and transmitting summarization data that is comparatively much smaller in size and easier to process, allowing the system to recover while still being able to perform important operations that otherwise would have required the full log data, such as monitoring system performance, triggering user-configured alarms, providing dashboard-based reporting, etc. In some embodiments, in addition to switching to summarization-based reporting, the clients can also switch to a last-in first-out (LIFO) mode (e.g., from a first-in first-out (FIFO) mode) when later resuming the transmission of raw log data to enable the system to restore full visibility into raw logs for more recent time periods—which will provide the most benefit—and then subsequently backfill the reporting of older raw log data. Accordingly, embodiments disclosed herein can provide increased monitoring service uptime and usefulness for its most important operations through increased resiliency to log data reporting problems that may arise.

Figure 1:
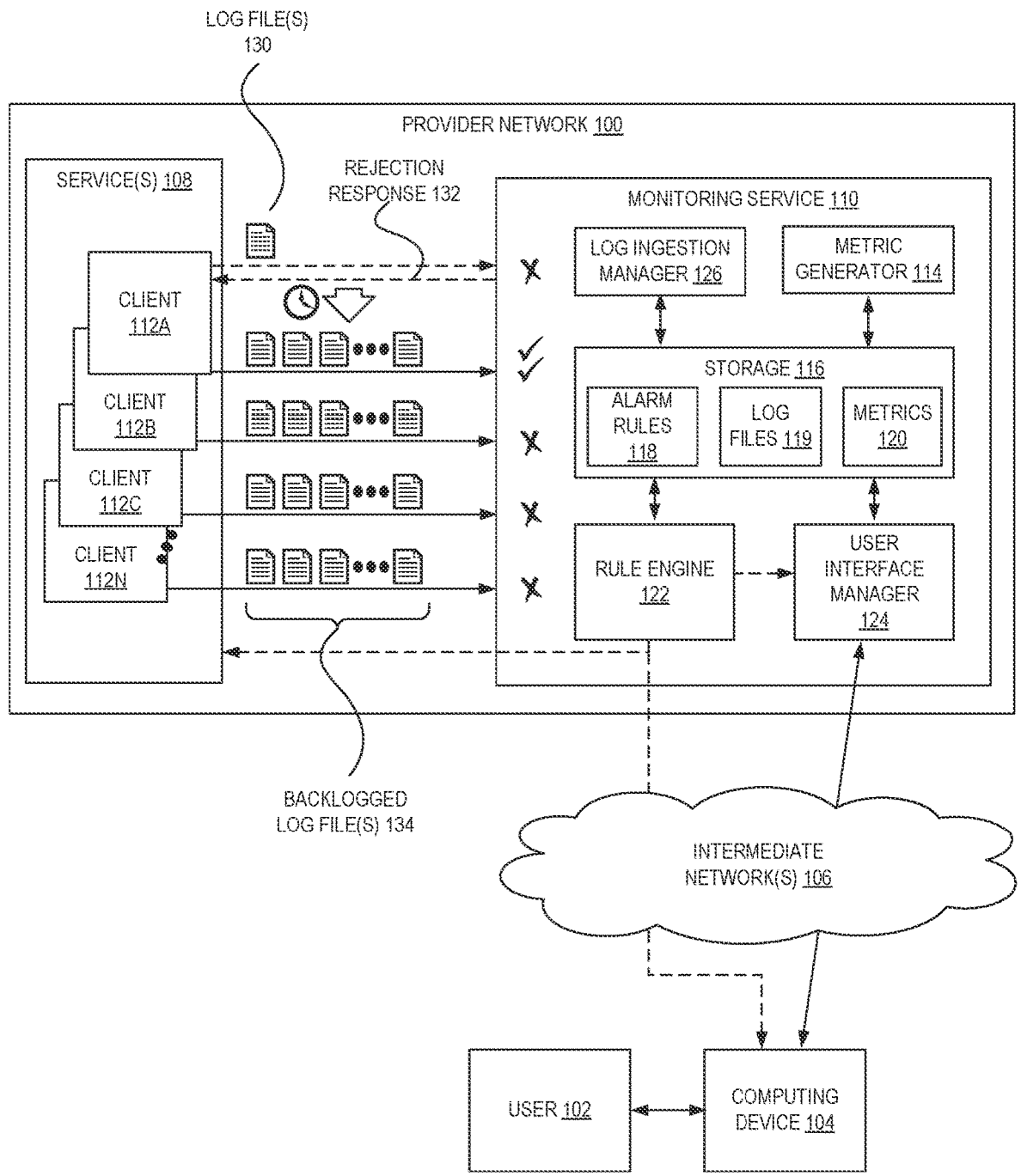
FIG. 1 is a diagram illustrating metric reporting issues in a computing environment.

FIG. 1 is a diagram illustrating metric reporting issues in a computing environment. In this example, a monitoring service 110 is implemented in a multi-tenant cloud provider network 100 that monitors various aspects of one or more services 108 of the cloud provider network via received log data generated by clients 112 executed by the service(s) 108. The monitoring service 110 may be implemented using software executed by one or more computing devices in one or multiple locations, such as within multiple availability zones (AZs) and/or regions of a provider network 100. The monitoring service 110 may be used by users such as DevOps engineers, developers, site reliability engineers (SREs), IT managers, etc., and provide data and actionable insights to allow the users the ability to monitor their applications, respond to system-wide performance changes, optimize resource utilization, and/or obtain a unified view of operational health. In some embodiments, the monitoring service 110 collects monitoring and operational data in the form of logs (e.g., server logs, access logs, network logs, etc.), metrics, and events, providing users with a unified view of their resources, applications, and services that run in the provider network 100 or in other locations (e.g., customer premises, data centers, edge locations of the provider network). Users may use a monitoring service 110 to, for example, detect anomalous behavior in their environments, set alarms, visualize logs and metrics side by side, take automated actions, troubleshoot issues, and/or discover insights to keep their applications running smoothly.

A provider network 100 (or, "cloud" provider network) provides users with the ability to use one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources can be provided as services (e.g., services 108), such as a hardware virtualization service that can execute compute instances, a storage service that can store data objects, etc. The users (or "customers") of provider networks 100, such as user 102, can use one or more user accounts that are associated with a customer account, though these terms can be used somewhat interchangeably depending upon the context of use. Users, via use of a computing device 104, can interact with a provider network 100 across one or more intermediate networks 106 (e.g., the internal via one or more interface(s), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) can be part of, or serve as a front-end to, a control plane of the provider network 100 that includes "backend" services supporting and enabling the services that can be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ (also known as a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

To provide these and other computing resource services, provider networks 100 often rely upon virtualization techniques. For example, virtualization technologies can provide users the ability to control or use compute resources (e.g., a "compute instance," such as a VM using a guest operating system (O/S) that operates using a hypervisor that might or might not further operate on top of an underlying host O/S, a container that might or might not operate in a VM, a compute instance that can execute on "bare metal" hardware without an underlying hypervisor), where one or multiple compute resources can be implemented using a single electronic device. Thus, a user can directly use a compute resource (e.g., provided by a hardware virtualization service) hosted by the provider network to perform a variety of computing tasks. Additionally, or alternatively, a user can indirectly use a compute resource by submitting code to be executed by the provider network (e.g., via an on-demand code execution service), which in turn uses one or more compute resources to execute the code—typically without the user having any control of or knowledge of the underlying compute instance(s) involved.

Various types of services 108 exist that may be offered to users of the provider network 100 and that can interface with a monitoring service 110 to provide visibility into their operation for the users. For example, an on-demand code execution service (referred to in various embodiments as a function compute service, functions service, cloud functions service, functions as a service, or serverless computing service) can enable users of the provider network 100 to execute their code on cloud resources without having to select or manage the underlying hardware resources used to execute the code. For example, a user can use the on-demand code execution service 116 by uploading their code and use one or more APIs to request that the service 116 identify, provision, and manage any resources required to run the code.

A hardware virtualization service (referred to in various implementations as an elastic compute service, a virtual machines service, a computing cloud service, a compute engine, or a cloud compute service) can enable users of the provider network 100 to provision and manage compute resources such as virtual machine instances. Virtual machine technology can use one physical server to run the equivalent of many servers (each of which is called a virtual machine), for example using a hypervisor, which can run at least on an offload card of the server (e.g., a card connected via PCI or PCIe to the physical CPUs) and other components of the virtualization host can be used for some virtualization management components. Such an offload card of the host can include one or more CPUs that are not available to user instances, but rather are dedicated to instance management tasks such as virtual machine management (e.g., a hypervisor), input/output virtualization to network-attached storage volumes, local migration management tasks, instance health monitoring, and the like). Virtual machines are commonly referred to as compute instances or simply "instances." As used herein, provisioning a virtual compute instance generally includes reserving resources (e.g., computational and memory resources) of an underlying physical compute instance for the client (e.g., from a pool of available physical compute instances and other resources), installing or launching required software (e.g., an operating system), and making the virtual compute instance available to the client for performing tasks specified by the client.

A container service can be a container orchestration and management service (referred to in various implementations as a container service, cloud container service, container engine, or container cloud service) that allows users of the cloud provider network to instantiate and manage containers. In some embodiments the container service 114 can be a Kubernetes-based container orchestration and management service (referred to in various implementations as a container service for Kubernetes, Azure Kubernetes service, IBM cloud Kubernetes service, Kubernetes engine, or container engine for Kubernetes). A container, as referred to herein, packages up code and all its dependencies so an application (also referred to as a task, pod, or cluster in various container services) can run quickly and reliably from one computing environment to another. A container image is a standalone, executable package of software that includes everything needed to run an application process: code, runtime, system tools, system libraries and settings. Container images become containers at runtime. Containers are thus an abstraction of the application layer (meaning that each container simulates a different software application process). Though each container runs isolated processes, multiple containers can share a common operating system, for example by being launched within the same virtual machine. In contrast, virtual machines are an abstraction of the hardware layer (meaning that each virtual machine simulates a physical machine that can run software). While multiple virtual machines can run on one physical machine, each virtual machine typically has its own copy of an operating system, as well as the applications and their related files, libraries, and dependencies. Some containers can be run on instances that are running a container agent, and some containers can be run on bare-metal servers, or on an offload card of a server.

As shown in FIG. 1, a potentially large number of clients 112A-112N across one or multiple services 108 of the provider network may send log files 130 (e.g., network communications logs, web server logs, system logs, virtual machine and/or virtual machine manager related logs, application specific logs, etc.) to a monitoring service 110. Alternatively, or additionally, some or all of the clients may be located or deployed outside of the provider network, e.g., as software or hardware of computing devices such as an Internet of Things (IoT) type device deployed at one or more locations, or software or hardware of a computing devices such as servers deployed in a user's own "on premise" network or the like. A log ingestion manager 126 of the monitoring service 110 may control and perform the receipt of the log files, store the log files 119 in a storage 116 (e.g., one or more object storage locations provided by a storage service), etc. A metric generator 114 may act upon the log files 119 to generate metrics 120, e.g., average values of dimensions of data (e.g., an average number of requests received or processed by an application, an average network bandwidth used by a particular compute instance, etc.), maximum values, minimum values, other statistical measures, etc. A rule engine 122, based on a set of alarm rules 118 configured by users that reference metrics 120, may determine whether any rules are satisfied and thus alarms are to be triggered, e.g., by sending a message/command to a corresponding service 108, sending a message to a computing device 104 of a user 104, e.g., via a direct notification such as a short message service (SMS) or other instant message, email, etc., or even via a message or notification within an application such as a web-based console by providing a notification to a user interface manager 124 that provides a control interface to the user (e.g., a web-based "console" application that allows for user-configuration of rules, service/application monitoring via dashboards, log viewing, etc.).

In some environments, there may be huge numbers (e.g., millions or more) of physical computing devices that provide computing resources to users as part of service(s) 108 and may execute system software including clients 112 (e.g., an agent) that produces telemetry log data and sends this data to a monitoring service 110 for collection, long-term retention, summarization, monitoring, alarms, visualization, etc. This configuration works very well in production environments; however, after an event that temporarily impairs the clients' ability to successfully upload the logs to the monitoring service 110, e.g., a transient network issue, outage of the client software, metrics server outage, etc., which may lead to a rejection response 132 sent on the part of the monitoring service 110 (indicating that the log file(s) may not be uploaded at this time), significant problems may arise.

When such impairments occur, the clients may effectively restart sending their backlogged log files 134 in unison, causing a flood of requests sent to the monitoring service 110, potentially leading to further problems by again overloading the monitoring service 110. For example, in these scenarios, the monitoring service 110 may not immediately be able to handle the several-fold increase in requested throughput that suddenly arrives, especially as every minute of impairment may add 100% to the amount of required per-minute server capacity. This can lead to several issues.

First, metrics are delayed by much longer duration than the initial outage, causing users who rely on these metrics to not have any visibility into the state of their applications, and thus failures or other occurrences may be not timely detected and remedied. Second, this can lead to various servers or components of the monitoring service 110 itself to be overloaded and/or crash, making the entire problem worse and worse and extending the outage caused by the initial event.

One solution could be to add a throttling aspect to the client reporting of log data, forcing these clients to wait for the backlog to drain. However, this still results in a lengthy outage in terms of a lack of visibility of current/recent metrics while the clients and monitoring service slowly "catch up."

Figure 2:
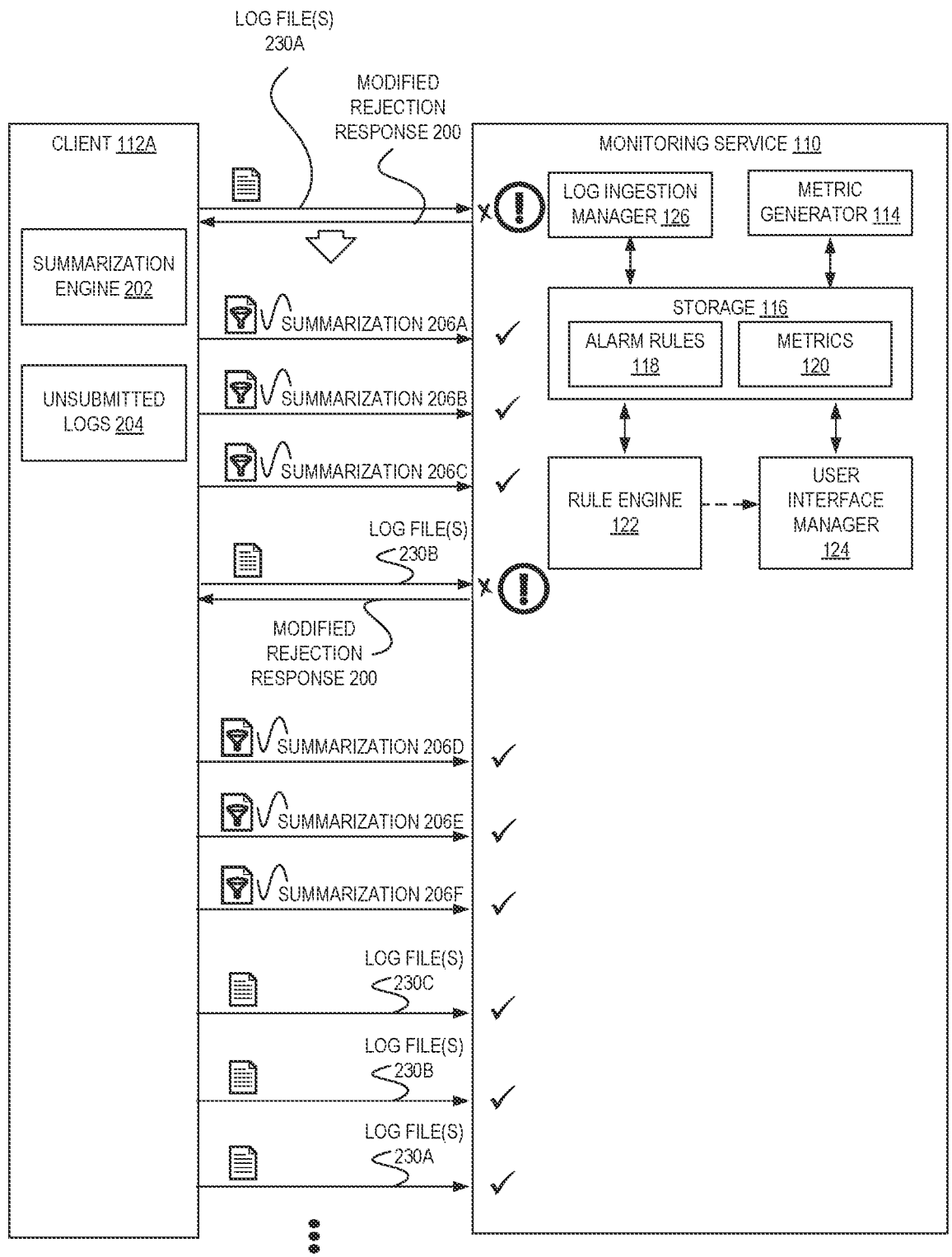
FIG. 2 is a diagram illustrating adaptive telemetry using cooperative selective summarization metric reporting according to some embodiments.

FIG. 2 is a diagram illustrating adaptive telemetry using cooperative selective summarization metric reporting according to some embodiments. In some embodiments, a system can avoid ones or all of the issues presented above by having clients switch from transmitting full raw log data to instead generating and transmitting smaller sized and more easily processed summarization data (based on the log data) to allow the monitoring service 110 to continue to provide active service (e.g., of core and important operations/functions) to its users without immediately needing or having access to full raw log files. In some embodiments, this switch can be accompanied by a switch, of the clients, from a from a first-in first-out (FIFO) log data transmission mode to a last-in first-out (LIFO) transmission mode. Under the LIFO transmission mode, as the full raw log data becomes able to be uploaded and processed, the monitoring service 110 is thus able to provide complete service to its users with the most recent (and typically, most important) data possible before the older, typically less critical, log data is transmitted and processed.

As shown in the example, upon a scenario in which clients are unable to provide log files 230A to the monitoring service 110 (and/or when the monitoring service 110 determines it cannot or does not wish to receive log files, perhaps due to detecting it will soon be overwhelmed or stressed beyond a threshold) a modified rejection response 200 can be originated by the log ingestion manager 126 of the monitoring service 110 to respond to a particular request to upload one or more log files 230A. In some embodiments, the modified rejection response 200 may comprise an HTTP response message (e.g., to respond to an HTTP request message seeking to upload the log file(s)) such as an "HTTP 503" (service unavailable) response or an "HTTP 429" (too many requests) response or similar. The modified rejection response 200 includes, in some embodiments, a retry after value indicating how long the client should wait before attempting to again upload a log file.

Upon receipt of this modified rejection response 200, the client 112A may determine that the monitoring service 110 is unable to receive raw log data and thus switch into a different mode of operation where the client will provide summarization data for at least a period of time and may also switch from a first-in first-out (FIFO) log data transmission mode to a last-in first-out (LIFO) transmission mode. Thus, after receipt of this modified rejection response 200, a summarization engine 202 may begin generating summarization data and transmit this summarization data (in the form of summarization 206A, 206B, 206, and the like) to the monitoring service 110. The monitoring service 110 may be configured to accept and process this summarization data despite not accepting raw log data (that continues to be generated and cached by the client 112A as unsubmitted logs 204) as it may be substantially smaller in size and/or require far less processing, e.g., metrics 120 may be pre-computed (e.g., by the summarization engine) or easily derived based on the summarizations it receives. Accordingly, the monitoring service 110 can continue getting recent metrics 120 of interest, evaluate alarm rules 118 (by the rule engine 122) based on these metrics, update a user interface by the user interface manager 124 to report metrics of interest and/or alarm rules violations, etc.

At some point—such as at or after the retry time value provided in the modified rejection response 200—the clients (e.g., client 112A and other non-illustrated clients) may attempt to transmit log file(s) 230B. In this example, log file(s) 230B are different than log file(s) 230A as they are from a more recent period of time and are being sent prior to log file(s) 230A due to the client now operating in the LIFO transmission mode as described above. In some cases, this transmission of log file(s) 230B may be accepted. In these cases, the client 112A may then continue to transmit other log files in reverse order according to the LIFO transmission mode scheme until all unsubmitted logs 204 have been sent to the monitoring service 110. At this point, or shortly thereafter, the clients (e.g., client 112A) may switch back to "regular" operations and thus again enter FIFO log data transmission mode and halt generating and sending summarization data.

However, as shown, in this first attempt at retransmission of log data (here, using the latest log data files 230B) the upload is refused and thus the client 112A may continue generating and transmitting summarization data 206D, 206E, 206F, etc., before again attempting to (and here, succeeding to) send log file(s) 230C, followed by log file(s) 230B, and then log file(s) 230A, upon which "regular" operational mode may be entered (e.g., switching back to FIFO log transmission, halting generating and transmitting summarization data).

In this figure, the client 112A determines that the monitoring service 110 is unable to accept raw log data via receipt of the modified rejection response 200. However, in other embodiments a client 112A can make these determinations in other ways, e.g., by not receiving a response back to a request the client sent to the monitoring service 110, by detecting a network failure (as known to those of skill in the art), by receiving a signal from a control plane entity of the provider network indicating an issue with the monitoring service 110, by determining that a recent (or average) latency of response from the monitoring service 110 meets or exceeds a threshold (e.g., when a moving window average—such as a truncated mean that ignores the top and bottom 1% of values—of the observed latency of operation rises a threshold percentage or exceeds a threshold), or the like.

To generate summarization data, the summarization engine 202 may be statically configured to generate summary statistics of particular dimensions of data in a particular manner based on the type of log files involved. For example, for a set of log files pertaining to CPU performance of a host device, the summarization engine 202 may be configured to always generate summary statistics such as a maximum CPU utilization amount (over a recent period of time), an average CPU utilization, a minimum CPU utilization amount, or the like.

However, in some embodiments, the summarization engine 202 can be configured directly by the monitoring service 110. For example, in some embodiments the monitoring service 110 informs the client 112A as to which dimensions of data are to be included in the summarization data, which time apertures (e.g., time window sizes, such as "every one second" or "every minute" or "every ten minutes") are to be used, or the like. This system configuration can allow for increased efficiency by allowing the client to generate only those metric values that are known to be needed (e.g., as referenced by configured alarms, or referenced by a dashboard) for a particular client that has resources associated with the user (e.g., the log data pertains to a compute instance—such as a virtual machine—of that user). Moreover, in some embodiments, the monitoring service 110 can dynamically change what dimensions of data are to be included in the summarization data over time. For example, during an initial system problem, the monitoring service 110 can provide data indicating only a small number of "critical" metrics are to be generated and provided; thereafter, such as when recovery is underway and the performance issues are being addressed, the monitoring service 110 may indicate that a larger number of metrics are to be generated and provided, etc.

Figure 3:
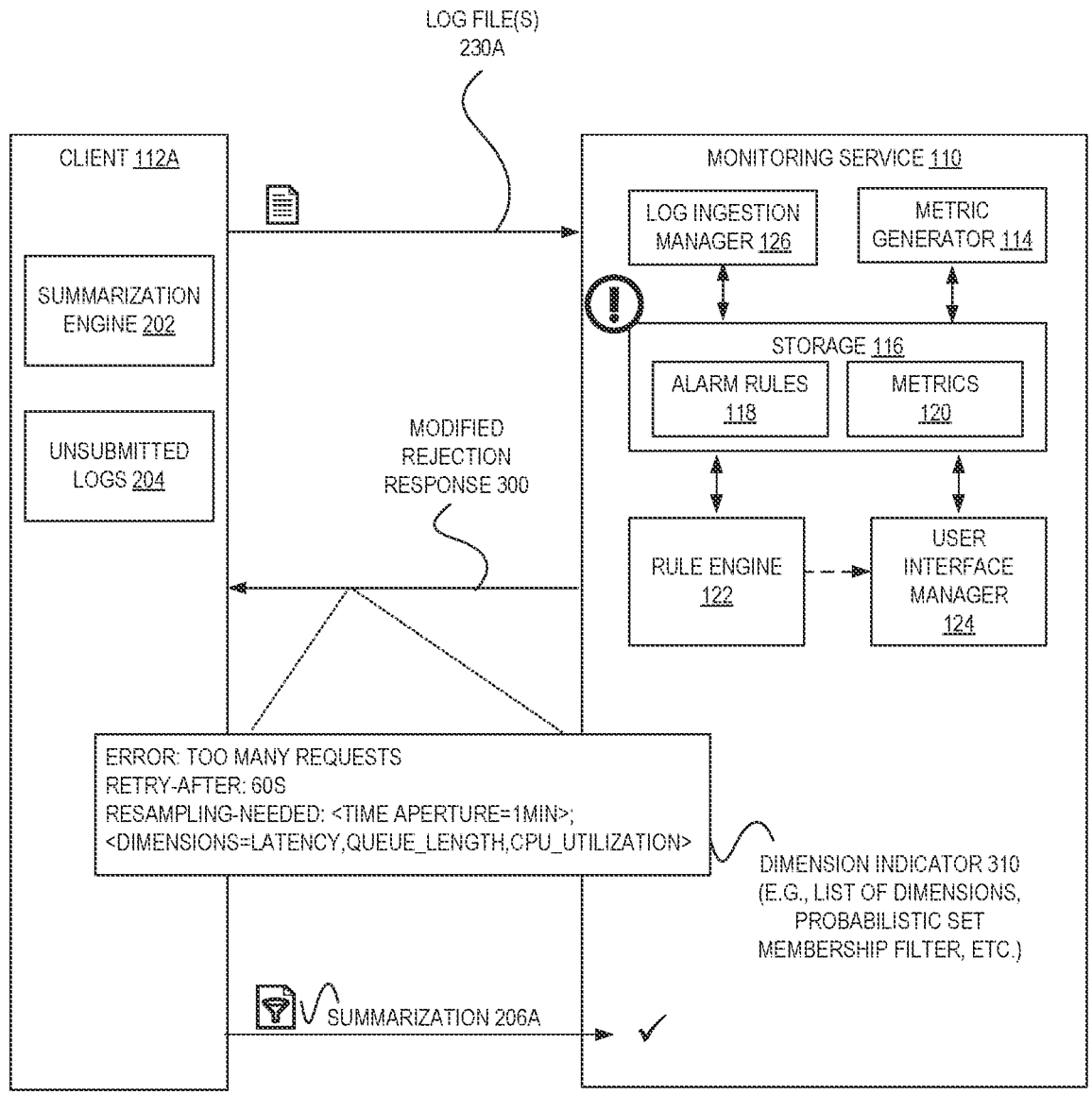
FIG. 3 is a diagram illustrating inline server-specified dimensional summarizations for adaptive telemetry using cooperative selective summarization metric reporting according to some embodiments.

For example, FIG. 3 is a diagram illustrating inline server-specified dimensional summarizations for adaptive telemetry using cooperative selective summarization metric reporting according to some embodiments. As shown in this example, a set of log file(s) 230A are requested to be transmitted to the monitoring service 110, but the monitoring service 110 instead sends a modified rejection response 300 indicating that the monitoring service 110 is unable/unwilling to accept the log file(s) 230A at this time.

In this example, the modified rejection response 300 includes a retry after value (here, indicating that the client should wait sixty seconds before attempting to retransmit log file(s)) and also includes information indicating which dimensions of data should be included in summarizations and which time aperture is to be utilized. As shown, the modified rejection response 300 carries this data in a "resampling-needed" header having a first "time aperture" key with a value of "1 minute" (indicating that summarization is to occur using data pertaining to one-minute windows of time) as well as a dimensions indicator 310 here having a list of dimensions of interest that the client is to generate—here, these values are "latency" and "queue_length" and "CPU_utilization" indicating a desire for metrics associated with some latency amount, some length of a queue, and some CPU utilization metric. Optionally, though not illustrated, the modified rejection response 300 may identify specific metric/summarization types for the dimensions (either specifically for each dimension, for some dimensions, or generally for all dimensions)—e.g., that the summarization engine 202 is to generate a minimum, maximum, and minimum metric; or, that the summarization engine 202 is to generate histogram-type data, optionally specifically a number of bins/ranges and/or the sizes of those bins/ranges.

Moreover, in some embodiments, instead of providing an explicit list of metrics of interest as the dimension indicator 310, the dimension indicator 310 may instead be a set of values making up a probabilistic set membership filter (e.g., a bloom filter, cuckoo filter, etc.). As some systems may have a large number of possible metrics, it is possible that providing a list of dimensional names could be very large in size (e.g., full names of fifty different dimensions). In such cases, the dimension indicator 310 could be a probabilistic set membership filter that allows the client to use the filter, using a known set of dimensions, to identify which dimensions are indicated as needed via this filter. This can result in significant space savings, as these filter values may simply be a few bits (e.g., tens of bits or fewer)—this can allow the modified rejection response 300 to be passed in a single TCP packet (or just a few packets), which can significantly reduce the load placed on the monitoring service during a time where some system problem may be occurring. Moreover, as ones of these types of filters (such as Bloom filters) are known to not have false negatives—though may have false positives, which wouldn't be a problem here as extra data could simply be discarded—this approach may be particularly well-suited in some environments or use cases.

Based on this information, the summarization engine 202 can generate the summarizations (including first summarization 206A) to match what is required by the monitoring service 110 to allow the monitoring service 110 to perform important operations that ordinarily would have been impossible given the lack of raw log files. For example, a user may have configured an alarm that is triggered if/when any of the user's fleet of compute instances has an average CPU utilization over any one-minute period above some threshold—thus, if the monitoring service 110 is able to receive this pre-computed information from clients associated with this fleet of compute instances, the monitoring service 110 can evaluate this alarm despite not having the typically "full" log files.

In this example, the required dimensions and/or associated time aperture is provided directly within a modified rejection response 300, though in other embodiments the information can be provided to clients in other ways. For example, in some embodiments the client 112A may obtain this information when first performing a handshake (e.g., an initial configuration) with the monitoring service 110 as it registers itself to begin providing log files, i.e., prior to any detection of an inability or unwillingness of the monitoring service 110 to actually receive log files. In some embodiments, the client 112A may also, or alternatively, send an API request to a non-illustrated component of the monitoring service 110 for the necessary dimensions and/or time aperture and receive a response from this component providing this information.

To determine which dimensions and/or time aperture are required, the monitoring service 110 can determine which alarm rules 118 are associated with resources being monitored by the client and/or which reporting modules are presented to an associated user via the user interface manager 124. Continuing the example, a user may have configured an alarm that is triggered if/when any of the user's fleet of compute instances has an average CPU utilization, over any one-minute period, above some threshold. In this case, the monitoring service 110 may determine which user(s) are associated with the log files being reported on by a particular client, identify any alarm rules of those user(s), and identify dimensions of data required by those rules (here, "average CPU utilization") and the time aperture (here, one minute) and provide this back to the client for use in generating the summarizations.

In some embodiments, the summarizations include histogram type data, e.g., values that are bucketized. As is known, a histogram is used to summarize discrete or continuous data. In some embodiments, the summarization engine 202 may generate histogram type data by, over a particular time aperture, constructing "buckets" of values where each bucket has an associated range and the value indicates, e.g., a number of data points that fall within the range. For example, for a particular dimension (e.g., CPU utilization) the summarization engine 202 may generate four different "buckets"—0-25, 26-50, 51-75, and 76-100. For any data point/element within the log data files, a value of the bucket may be increased/adjusted that corresponds to the particular CPU utilization of that data point. For example, a first CPU utilization reading of 53% may cause the third bucket (corresponding to range [51,75]) to be increased by one value. In some cases, this histogram data may be exponential histogram data, where an exponential histogram (in which the data is binned in an exponential fashion) is generated and reported.

Beneficially, some embodiments use histogram summarizations to allow the monitoring service 110 to generate particular metrics quickly and easily, with high accuracy, with data from multiple clients. For example, if an alarm is configured based on a percentile value (e.g., P99) across multiple compute instances (reported on by multiple clients), this percentile value could not be computed if the monitoring service 110 only had a single value from each client—instead, with the histogram information, a percentile with a known loss bound can quickly be computed that is sufficient for use in alarms, dashboards, and the like.

Figure 4:
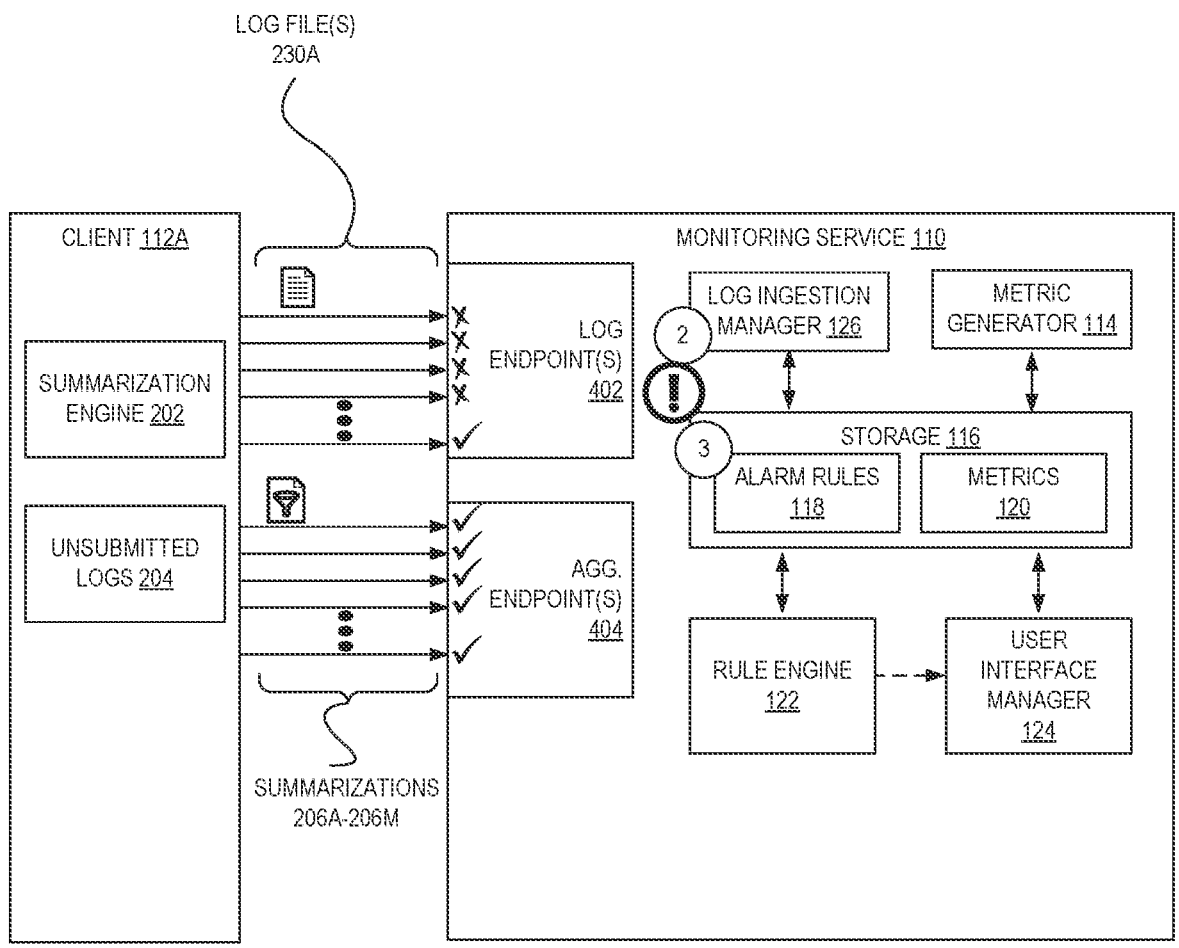
FIG. 4 is a diagram illustrating heterogeneous endpoint usage for adaptive telemetry using cooperative selective summarization metric reporting according to some embodiments.

FIG. 4 is a diagram illustrating heterogeneous endpoint usage for adaptive telemetry using cooperative selective summarization metric reporting according to some embodiments. In some embodiments, multiple endpoints (e.g., applications associated with different network addresses) may be used that can accept different types of data—e.g., log data endpoint(s) 402 for receiving log files 230 and summarization endpoint(s) 404 for receiving summarization data.

In some embodiments, as illustrated, log files 230 may initially be sent to (or, attempted to be sent to) the log data endpoint(s) 402 and then, if and when needed, summarizations 206A-206M are sent to the summarization endpoints 404. This configuration allows the summarization endpoints 404 to remain responsive even if the log data endpoint(s) 402 may be overwhelmed or experiencing issues.

In some embodiments, some or all clients may be configured to send summarizations in addition to raw log files in an "always on" model, e.g., to allow for very rapid transmission and processing of summarizations (e.g., for extremely fast alarm evaluation or dashboard reporting) and more in-depth analysis via use of the raw log files. Thus, a client may continually send raw log files (when able) to log endpoint(s) 402 and continually generate and send summarizations 206 to summarization endpoint(s) 404. Simultaneously, other clients (e.g., Internet of Things (IoT) applications) may be more resource constrained and thus it may be relatively resource expensive to compute summarizations such as histograms, so these clients may only generate and transmit summarizations solely when the raw logs are unable to be sent as described above.

Figure 5:
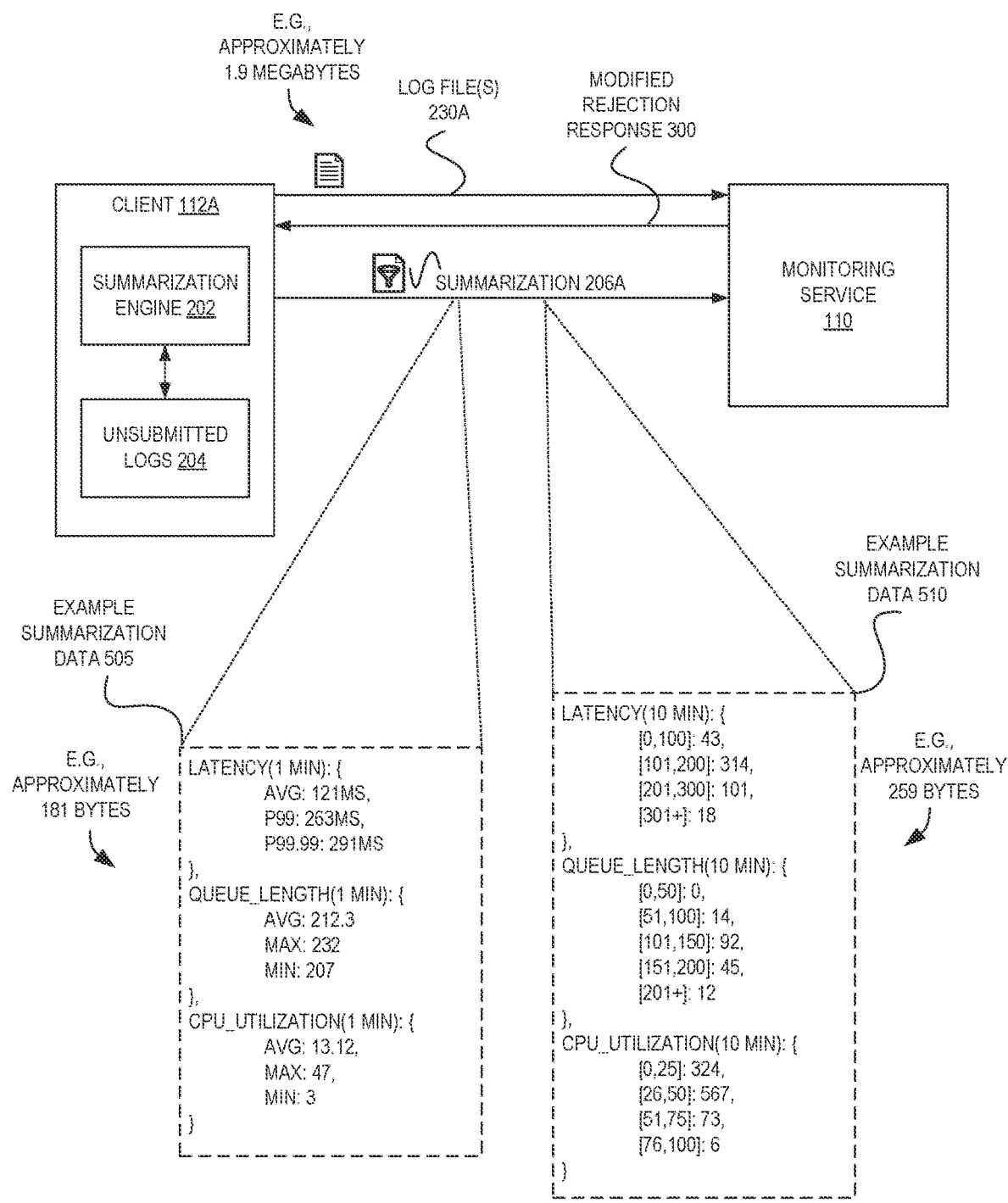
FIG. 5 is a diagram illustrating exemplary summarization data for adaptive telemetry using cooperative selective summarization metric reporting according to some embodiments.

FIG. 5 is a diagram illustrating exemplary summarization data for adaptive telemetry using cooperative selective summarization metric reporting according to some embodiments. As described herein, a variety of types of summarization data can be generated by clients and provided to a recipient such as a monitoring service 110. Generally, to provide substantial benefit, it is useful for the summarization data to be smaller in file/object size than any raw log data file(s) that it may represent. For example, in some cases it is possible for the summarization data to be a few bytes, tens of bytes, hundreds of bytes, etc., while the full associated raw log data may be tens, hundreds, thousands or more times larger (e.g., nearly two megabytes for a full raw log data with the associated summarization data being potentially less than a kilobyte in size). This substantially reduces the amount of available bandwidth required by the recipient (here, the monitoring service 110, though other types of recipients may be used in different applications of these techniques), the amount of time spent receiving the data, the amount of memory required by the recipient to hold this data, etc. Further, by generating and providing summarizations, the recipient monitoring service 110 has effectively entirely or mostly offloaded log processing to the client 112A, reducing the load placed on the monitoring service 110 and allowing it to recover from issues while still being able to provide essential services to its users.

Two exemplary types of summarization data are shown in FIG. 5, which reflect just a few possible summarization data types and values for three exemplary dimensions of interest. In this example, each example summarization data 505, 510 provide summarization data for dimensions including latency, queue length, and CPU utilization—each at a time aperture of one minute (e.g., where the summarization data summary statistics pertain to one minute of observed data).

As example summarization data 505, each dimension may be reported with one or more summary statistic types—here, the latency dimension is reported with an average/mean value, a P99 value, and a P99.99 value; while both the queue length dimension and the CPU utilization dimension are each reported with an average, maximum, and minimum value over the time window. Such metrics may be useful when, for example, a user has dashboards that seek to show these types of values (or alarms that monitor these values) on a per-client basis (e.g., on a per-instance basis, where the instance is monitored by a particular client).

Other exemplary summarization data 510 is shown with the same dimensions; however, the time aperture and the particular type of metrics reported are different (further, the example numerical values do not correspond to those shown with regard to summarization data 505). Here, the summarization data is reported back via histogram-type data, where individual samples were collected and binned by the client 112A. As shown, the latency is shown with four bands/bins representing [0,100], [101,200], [201,300], and [301+], with associated values here indicating counts of samples take that fall into the corresponding band/bin. As indicated herein, other types of sampling techniques may be used, such as exponential histograms (e.g., where the sizes of each of the bins are exponential) or the like. In various use cases, such histogram-type data can be useful to allow the monitoring service 110 to easily be able to generate high-quality estimates across a fleet of resources, e.g., computing percentile estimates (e.g., a P99 value), which otherwise may not be possible with other summarization types.

FIG. 6 is a flow diagram illustrating operations of a method 600 for adaptive telemetry using cooperative selective summarization metric reporting according to some embodiments. Some or all of the operations 600 (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some embodiments, one or more (or all) of the operations 600 are performed by the clients 112 of the other figures.

The operations 600 include, at block 602, determining, by a client process, that a server (e.g., of a monitoring service in a multi-tenant cloud provider network) is unable to receive a transmission of log data from the client process.

In some embodiments, block 602 includes transmitting a request message to the server to upload the log data; and receiving, in response to the request, a response message originated by the server indicating a rejection of the request. In some embodiments, the response message includes a retry time value indicating a subsequent time when the client process may again retry the transmission of the log data; and the transmitting of the summarization data occurs prior to the subsequent time. In some embodiments, the response message identifies one or more dimensions of data, from or based on the log data, that the client process is to provide within the summarization data; the generating of the summarization data comprises generating statistical summarizations of each of the one or more dimensions; and the summarization data includes the statistical summarizations of each of the one or more dimensions. In some embodiments, the response message further identifies a time aperture value indicating a window size to be used for the statistical summarizations. In some embodiments, the one or more dimensions of data correspond to one or more metrics monitored by the server as part of evaluating user-configured alarms or for providing a monitoring dashboard to the user.

The operations 600 further include, at block 604, generating, by the client process, a summarization data that is smaller in size than the log data and provides a statistical summary of at least some of the log data. In some embodiments, the summarization data comprises, for at least one dimension, histogram data providing summarizations of values across multiple bins over a time aperture. The histogram data, in some embodiments, comprises exponential histogram data where values are binned across the multiple bins in an exponential manner.

The operations 600 further include, at block 606, transmitting the summarization data to the server.

In some embodiments, block 604 and block 606 occur responsive to block 602, and further responsive to block 602, the operations 600 may include switching from a first-in first-out (FIFO) log data transmission mode to a last-in first-out (LIFO) transmission mode; and at a point in time later than the transmitting of the summarization data, transmitting a second log data to the server prior to attempting to retransmit the log data based on being in the LIFO transmission mode.

The operations 600, in some embodiments, also include receiving, prior to block 602, a message from the server identifying one or more dimensions of interest to be provided by the client process as part of the summarization data. In some embodiments, the message is received by the client process during a handshake process with the server or via a server response to an application programming interface (API) request sent by the client process seeking the one or more dimensions of interest.

Figure 7:
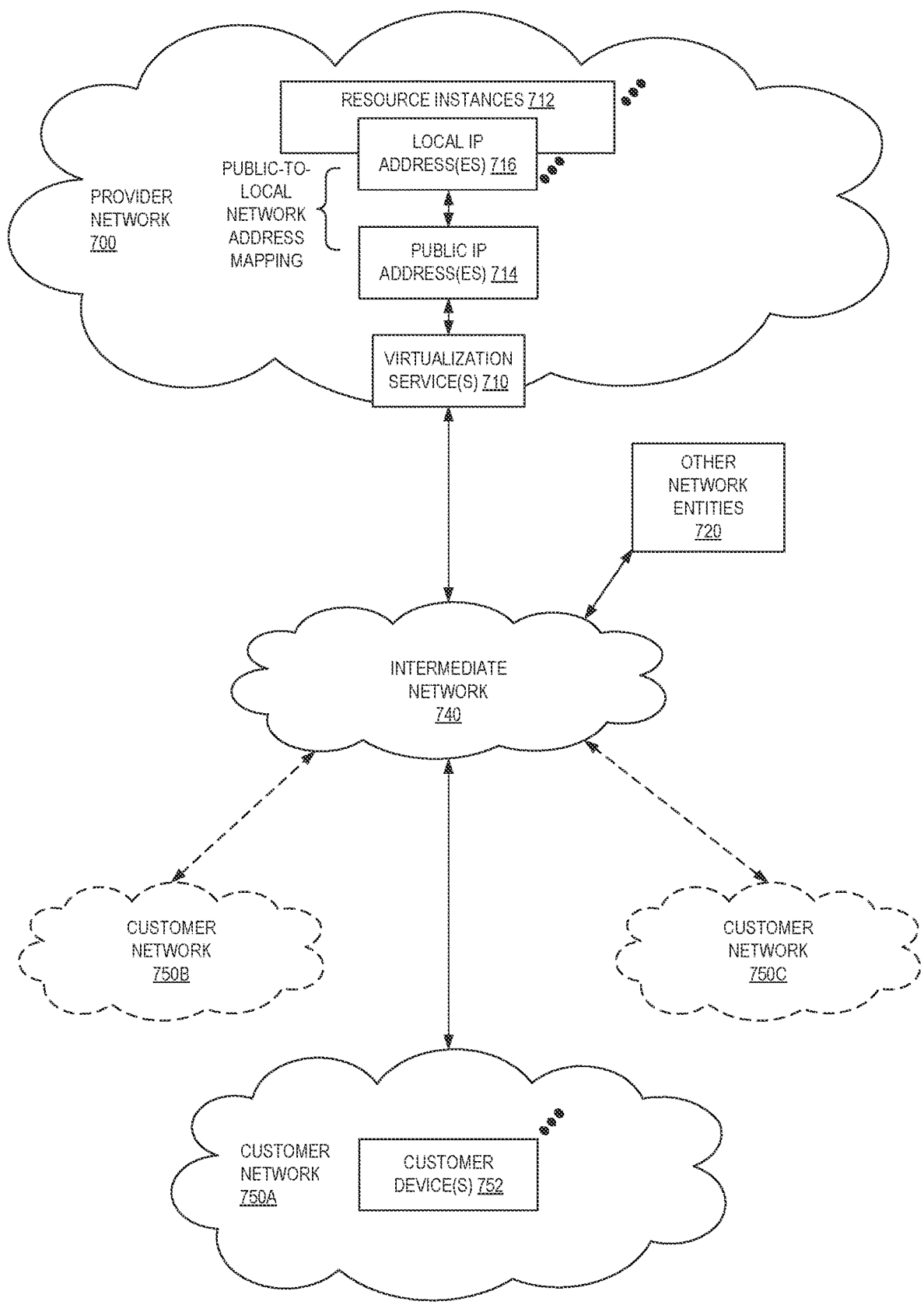
FIG. 7 illustrates an example provider network environment according to some embodiments.

FIG. 7 illustrates an example provider network (or "service provider system") environment according to some embodiments. A provider network 700 can provide resource virtualization to customers via one or more virtualization services 710 that allow customers to purchase, rent, or otherwise obtain instances 712 of virtualized resources, including but not limited to computation and storage resources, implemented on devices within the provider network or networks in one or more data centers. Local Internet Protocol (IP) addresses 716 can be associated with the resource instances 712; the local IP addresses are the internal network addresses of the resource instances 712 on the provider network 700. In some embodiments, the provider network 700 can also provide public IP addresses 714 and/or public IP address ranges (e.g., Internet Protocol version 4 (IPv4) or Internet Protocol version 6 (IPv6) addresses) that customers can obtain from the provider 700.

Conventionally, the provider network 700, via the virtualization services 710, can allow a customer of the service provider (e.g., a customer that operates one or more customer networks 750A-750C (or "client networks") including one or more customer device(s) 752) to dynamically associate at least some public IP addresses 714 assigned or allocated to the customer with particular resource instances 712 assigned to the customer. The provider network 700 can also allow the customer to remap a public IP address 714, previously mapped to one virtualized computing resource instance 712 allocated to the customer, to another virtualized computing resource instance 712 that is also allocated to the customer. Using the virtualized computing resource instances 712 and public IP addresses 714 provided by the service provider, a customer of the service provider such as the operator of the customer network(s) 750A-750C can, for example, implement customer-specific applications and present the customer's applications on an intermediate network 740, such as the Internet. Other network entities 720 on the intermediate network 740 can then generate traffic to a destination public IP address 714 published by the customer network(s) 750A-750C; the traffic is routed to the service provider data center, and at the data center is routed, via a network substrate, to the local IP address 716 of the virtualized computing resource instance 712 currently mapped to the destination public IP address 714. Similarly, response traffic from the virtualized computing resource instance 712 can be routed via the network substrate back onto the intermediate network 740 to the source entity 720.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and can be mutable within the provider network. Network traffic originating outside the provider network is not directly routed to local IP addresses; instead, the traffic uses public IP addresses that are mapped to the local IP addresses of the resource instances. The provider network can include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses can be assigned by the provider network infrastructure to particular resource instances; these public IP addresses can be referred to as standard public IP addresses, or simply standard IP addresses. In some embodiments, the mapping of a standard IP address to a local IP address of a resource instance is the default launch configuration for all resource instance types.

At least some public IP addresses can be allocated to or obtained by customers of the provider network 700; a customer can then assign their allocated public IP addresses to particular resource instances allocated to the customer. These public IP addresses can be referred to as customer public IP addresses, or simply customer IP addresses. Instead of being assigned by the provider network 700 to resource instances as in the case of standard IP addresses, customer IP addresses can be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 8:
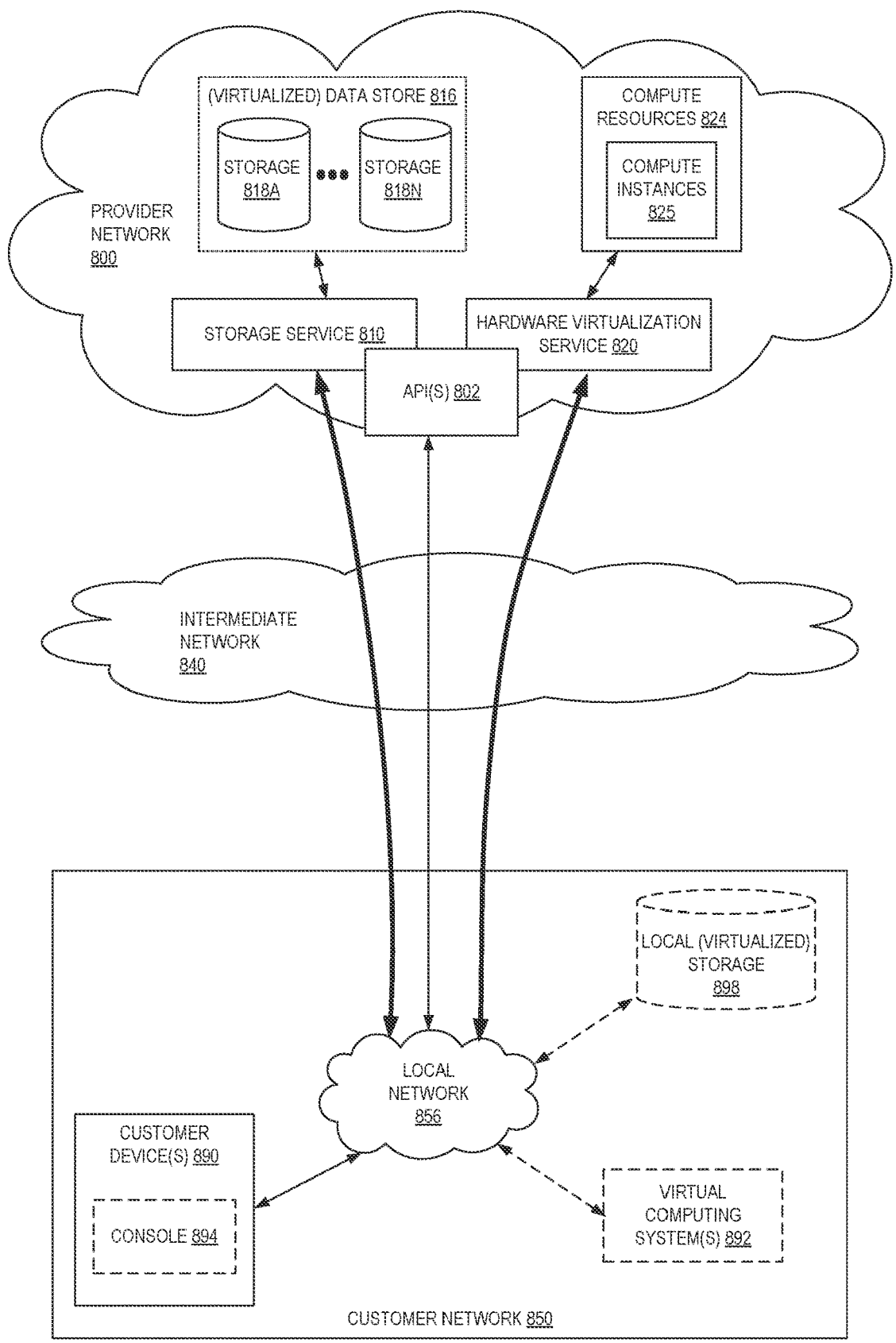
FIG. 8 is a block diagram of an example provider network that provides a storage service and a hardware virtualization service to customers according to some embodiments.

FIG. 8 is a block diagram of an example provider network environment that provides a storage service and a hardware virtualization service to customers, according to some embodiments. A hardware virtualization service 820 provides multiple compute resources 824 (e.g., compute instances 825, such as VMs) to customers. The compute resources 824 can, for example, be provided as a service to customers of a provider network 800 (e.g., to a customer that implements a customer network 850). Each computation resource 824 can be provided with one or more local IP addresses. The provider network 800 can be configured to route packets from the local IP addresses of the compute resources 824 to public Internet destinations, and from public Internet sources to the local IP addresses of the compute resources 824.

The provider network 800 can provide the customer network 850, for example coupled to an intermediate network 840 via a local network 856, the ability to implement virtual computing systems 892 via the hardware virtualization service 820 coupled to the intermediate network 840 and to the provider network 800. In some embodiments, the hardware virtualization service 820 can provide one or more APIs 802, for example a web services interface, via which the customer network 850 can access functionality provided by the hardware virtualization service 820, for example via a console 894 (e.g., a web-based application, standalone application, mobile application, etc.) of a customer device 890. In some embodiments, at the provider network 800, each virtual computing system 892 at the customer network 850 can correspond to a computation resource 824 that is leased, rented, or otherwise provided to the customer network 850.

From an instance of the virtual computing system(s) 892 and/or another customer device 890 (e.g., via console 894), the customer can access the functionality of a storage service 810, for example via the one or more APIs 802, to access data from and store data to storage resources 818A-818N of a virtual data store 816 (e.g., a folder or "bucket," a virtualized volume, a database, etc.) provided by the provider network 800. In some embodiments, a virtualized data store gateway (not shown) can be provided at the customer network 850 that can locally cache at least some data, for example frequently accessed or critical data, and that can communicate with the storage service 810 via one or more communications channels to upload new or modified data from a local cache so that the primary store of data (the virtualized data store 816) is maintained. In some embodiments, a user, via the virtual computing system 892 and/or another customer device 890, can mount and access virtual data store 816 volumes via the storage service 810 acting as a storage virtualization service, and these volumes can appear to the user as local (virtualized) storage 898.

While not shown in FIG. 8, the virtualization service(s) can also be accessed from resource instances within the provider network 800 via the API(s) 802. For example, a customer, appliance service provider, or other entity can access a virtualization service from within a respective virtual network on the provider network 800 via the API(s) 802 to request allocation of one or more resource instances within the virtual network or within another virtual network.

Illustrative Systems

Figure 9:
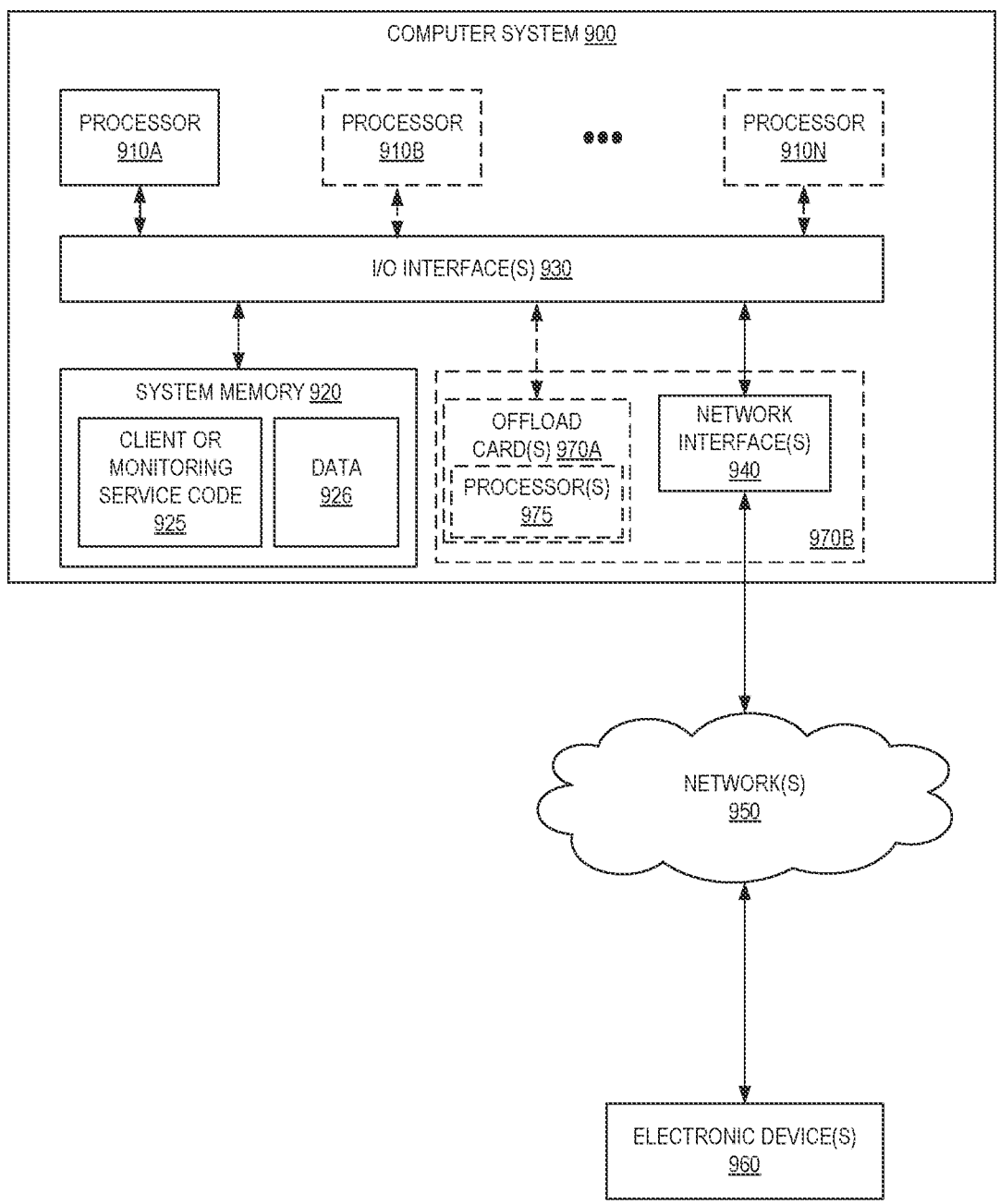
FIG. 9 is a block diagram illustrating an example computer system that can be used in some embodiments.

In some embodiments, a system that implements a portion or all of the techniques described herein can include a general-purpose computer system, such as the computer system 900 illustrated in FIG. 9, that includes, or is configured to access, one or more computer-accessible media. In the illustrated embodiment, the computer system 900 includes one or more processors 910 coupled to a system memory 920 via an input/output (I/O) interface 930. The computer system 900 further includes a network interface 940 coupled to the I/O interface 930. While FIG. 9 shows the computer system 900 as a single computing device, in various embodiments the computer system 900 can include one computing device or any number of computing devices configured to work together as a single computer system 900.

In various embodiments, the computer system 900 can be a uniprocessor system including one processor 910, or a multiprocessor system including several processors 910 (e.g., two, four, eight, or another suitable number). The processor(s) 910 can be any suitable processor(s) capable of executing instructions. For example, in various embodiments, the processor(s) 910 can be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 910 can commonly, but not necessarily, implement the same ISA.

The system memory 920 can store instructions and data accessible by the processor(s) 910. In various embodiments, the system memory 920 can be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within the system memory 920 as client and/or monitoring service code 925 (e.g., executable to implement, in whole or in part, a client 112 or monitoring service 110) and data 926.

In some embodiments, the I/O interface 930 can be configured to coordinate I/O traffic between the processor 910, the system memory 920, and any peripheral devices in the device, including the network interface 940 and/or other peripheral interfaces (not shown). In some embodiments, the I/O interface 930 can perform any necessary protocol, timing, or other data transformations to convert data signals from one component (e.g., the system memory 920) into a format suitable for use by another component (e.g., the processor 910). In some embodiments, the I/O interface 930 can include support for devices attached through various types of peripheral buses, such as a variant of the Peripheral Component Interconnect (PCI) bus standard or the Universal Serial Bus (USB) standard, for example. In some embodiments, the function of the I/O interface 930 can be split into two or more separate components, such as a north bridge and a south bridge, for example. Also, in some embodiments, some or all of the functionality of the I/O interface 930, such as an interface to the system memory 920, can be incorporated directly into the processor 910.

The network interface 940 can be configured to allow data to be exchanged between the computer system 900 and other devices 960 attached to a network or networks 950, such as other computer systems or devices as illustrated in FIG. 1, for example. In various embodiments, the network interface 940 can support communication via any suitable wired or wireless general data networks, such as types of Ethernet network, for example. Additionally, the network interface 940 can support communication via telecommunications/telephony networks, such as analog voice networks or digital fiber communications networks, via storage area networks (SANs), such as Fibre Channel SANs, and/or via any other suitable type of network and/or protocol.

In some embodiments, the computer system 900 includes one or more offload cards 970A or 970B (including one or more processors 975, and possibly including the one or more network interfaces 940) that are connected using the I/O interface 930 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 900 can act as a host electronic device (e.g., operating as part of a hardware virtualization service) that hosts compute resources such as compute instances, and the one or more offload cards 970A or 970B execute a virtualization manager that can manage compute instances that execute on the host electronic device. As an example, in some embodiments the offload card(s) 970A or 970B can perform compute instance management operations, such as pausing and/or un-pausing compute instances, launching and/or terminating compute instances, performing memory transfer/copying operations, etc. These management operations can, in some embodiments, be performed by the offload card(s) 970A or 970B in coordination with a hypervisor (e.g., upon a request from a hypervisor) that is executed by the other processors 910A-910N of the computer system 900. However, in some embodiments the virtualization manager implemented by the offload card(s) 970A or 970B can accommodate requests from other entities (e.g., from compute instances themselves), and cannot coordinate with (or service) any separate hypervisor.

In some embodiments, the system memory 920 can be one embodiment of a computer-accessible medium configured to store program instructions and data as described above. However, in other embodiments, program instructions and/or data can be received, sent, or stored upon different types of computer-accessible media. Generally speaking, a computer-accessible medium can include any non-transitory storage media or memory media such as magnetic or optical media, e.g., disk or DVD/CD coupled to the computer system 900 via the I/O interface 930. A non-transitory computer-accessible storage medium can also include any volatile or non-volatile media such as RAM (e.g., SDRAM, double data rate (DDR) SDRAM, SRAM, etc.), read only memory (ROM), etc., that can be included in some embodiments of the computer system 900 as the system memory 920 or another type of memory. Further, a computer-accessible medium can include transmission media or signals such as electrical, electromagnetic, or digital signals, conveyed via a communication medium such as a network and/or a wireless link, such as can be implemented via the network interface 940.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments use at least one network that would be familiar to those skilled in the art for supporting communications using any of a variety of widely available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments using a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also can be capable of executing programs or scripts in response requests from user devices, such as by executing one or more Web applications that can be implemented as one or more scripts or programs written in any programming language, such as Java®, C, C# or C++, or any scripting language, such as Perl, Python, PHP, or TCL, as well as combinations thereof. The server(s) can also include database servers, including without limitation those commercially available from Oracle®, Microsoft®, Sybase®, IBM®, etc. The database servers can be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system can also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments can be practiced without the specific details. Furthermore, well-known features can be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 818A-818N) can be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters might or might not have the same number of instances in various embodiments.

References to "one embodiment," "an embodiment," "an example embodiment," etc., indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given embodiment requires at least one of A, at least one of B, and at least one of C to each be present.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

The specification and drawings are, accordingly, to be regarded in an illustrative rather than a restrictive sense. It will, however, be evident that various modifications and changes can be made thereunto without departing from the broader spirit and scope of the disclosure as set forth in the claims.

What is claimed is:

1. A computer-implemented method comprising:
    transmitting, by a client process, a request to upload log data to a monitoring service of a multi-tenant provider network;
    transmitting, by the monitoring service, a response to the request that indicates a rejection of the request, the response including a retry time value indicating a subsequent time when the client process may again retry transmission of log data, and wherein the response further identifies one or more dimensions of data, from or based on the log data, that the client process is to provide within summarization data;
    receiving, by the client process, the response;
    generating, by the client process based on the identified one or more dimensions of data, a summarization data that is smaller in size than the log data and provides a statistical summary of at least some of the log data; and
    transmitting, prior to the subsequent time, the summarization data to the monitoring service.

2. The computer-implemented method of claim 1, further comprising:
    transmitting, at or after the subsequent time, a second log data to the monitoring service prior to transmitting the log data, based on having switched from a first-in first-out (FIFO) log data transmission mode to a last-in first-out (LIFO) transmission mode.

3. The computer-implemented method of claim 1, wherein the summarization data comprises, for at least one of the one or more dimensions, histogram data providing summarizations of values across multiple bins over a time aperture, wherein the histogram data comprises exponential histogram data where values were binned across multiple bins in an exponential manner.

4. A computer-implemented method comprising:
    determining, by a client process, that a server is unable to receive a transmission of log data from the client process, comprising:
        transmitting a request message to the server to upload the log data; and
        receiving, in response to the request message, a response message originated by the server indicating a rejection of the request message, wherein the response message includes data that allows the client process to identify one or more dimensions of data, from or based on the log data, that the client process is to provide within a summarization data;
    generating, by the client process, the summarization data that is smaller in size than the log data and provides a statistical summary of at least some of the log data wherein the generating comprises generating statistical summarizations of each of the one or more dimensions, and wherein the summarization data includes the statistical summarizations of each of the one or more dimensions; and
    transmitting the summarization data to the server.

5. The computer-implemented method of claim 4, wherein:
    the response message further includes a retry time value indicating a subsequent time when the client process may again retry the transmission of the log data; and
    the transmitting of the summarization data occurs prior to the subsequent time.

6. The computer-implemented method of claim 4, wherein the response message further identifies a time aperture value indicating a window size to be used for the statistical summarizations.

7. The computer-implemented method of claim 4, wherein the one or more dimensions of data correspond to one or more metrics monitored by the server as part of evaluating user-configured alarms or for providing a monitoring dashboard to a user.

8. The computer-implemented method of claim 4, wherein the data that allows the client process to identify the one or more dimensions of data comprises values for a probabilistic set membership filter.

9. The computer-implemented method of claim 4, wherein the summarization data comprises, for at least one dimension, histogram data providing summarizations of values across multiple bins over a time aperture.

10. The computer-implemented method of claim 9, wherein the histogram data comprises exponential histogram data where values are binned across the multiple bins in an exponential manner.

11. The computer-implemented method of claim 4, wherein:
the generating of the summarization data and the transmitting of the summarization data occur responsive to the determining that the server is unable to receive the transmission of log data;
further responsive to the determining that the server is unable to receive the transmission of log data, switching from a first-in first-out (FIFO) log data transmission mode to a last-in first-out (LIFO) transmission mode; and
at a point in time later than the transmitting of the summarization data, transmitting a second log data to the server prior to attempting to retransmit the log data based on being in the LIFO transmission mode.

12. The computer-implemented method of claim 4, further comprising:
prior to the determining that the server is unable to receive the transmission of log data, receiving a message from the server identifying one or more dimensions of interest to be provided by the client process as part of the summarization data.

13. The computer-implemented method of claim 12, wherein the message is received by the client process during a handshake process with the server or via a server response to an application programming interface (API) request sent by the client process seeking the one or more dimensions of interest.

14. A system comprising:
a first one or more electronic devices to implement a monitoring service in a multi-tenant provider network; and
a second one or more electronic devices to execute applications or code for users of the multi-tenant provider network, the second one or more electronic devices including instructions that upon execution cause the second one or more electronic devices to:
determine, by a client process executed by the second one or more electronic devices, that the monitoring service is unable to receive a transmission of log data from the client process, wherein as part of the determination the client process is to:
transmit a request message to the monitoring service to upload the log data; and
receive, in response to the request message, a response message originated by the monitoring service indicating a rejection of the request message, wherein the response message includes data allowing the client process to identify one or more dimensions of data, from or based on the log data, that the client process is to provide within a summarization data;
generate, by the client process, the summarization data that is smaller in size than the log data and provides a statistical summary of at least some of the log data, wherein to generate the summarization data to client process is to at least generate statistical summarizations of each of the one or more dimensions, wherein the summarization data includes the statistical summarizations of each of the one or more dimensions; and
transmit the summarization data to the monitoring service.

15. The system of claim 14, wherein:
the response message includes a retry time value indicating a subsequent time when the client process may again retry the transmission of the log data; and
the transmission of the summarization data is to occur prior to the subsequent time.

16. The system of claim 14, wherein the one or more dimensions of data correspond to one or more metrics monitored by the monitoring service as part of evaluating user-configured alarms or for providing a monitoring dashboard to a user, and wherein the data allowing the client process to identify one or more dimensions of data comprises a list of identifiers of the one or more dimensions or values for a probabilistic set membership filter.

17. A computer-implemented method comprising:
determining, by a client process, that a server is unable to receive a transmission of log data from the client process;
generating, by the client process, a summarization data that is smaller in size than the log data and provides a statistical summary of at least some of the log data, wherein the summarization data comprises, for at least one dimension, histogram data providing summarizations of values across multiple bins over a time aperture; and
transmitting the summarization data to the server.

18. A computer-implemented method comprising:
determining, by a client process, that a server is unable to receive a transmission of log data from the client process;
generating, by the client process, a summarization data that is smaller in size than the log data and provides a statistical summary of at least some of the log data;
transmitting the summarization data to the server, wherein the generating of the summarization data and the transmitting of the summarization data occur responsive to the determining that the server is unable to receive the transmission of log data;
further responsive to the determining that the server is unable to receive the transmission of log data, switching from a first-in first-out (FIFO) log data transmission mode to a last-in first-out (LIFO) transmission mode; and
at a point in time later than the transmitting of the summarization data, transmitting a second log data to the server prior to attempting to retransmit the log data based on being in the LIFO transmission mode.

19. A computer-implemented method comprising:
determining, by a client process, that a server is unable to receive a transmission of log data from the client process;
generating, by the client process, a summarization data that is smaller in size than the log data and provides a statistical summary of at least some of the log data;
transmitting the summarization data to the server; and
prior to the determining that the server is unable to receive the transmission of log data, receiving a message from the server identifying one or more dimensions of interest to be provided by the client process as part of the summarization data.

20. The computer-implemented method of claim 19, wherein the message is received by the client process during a handshake process with the server or via a server response to an application programming interface (API) request sent by the client process seeking the one or more dimensions of interest.

* * * * *